United States Patent [19]

Zürn et al.

[11] Patent Number: 5,297,741
[45] Date of Patent: Mar. 29, 1994

[54] PROCESS FOR DISINTEGRATION AND PURE-SORTED SEPARATION OF RECYCLABLE DIFFERENT PLASTICS OF COMPOSITE STRUCTURAL PARTS

[75] Inventors: Jörg Zürn, Ulm; Michele Melchiorre, Blaustein; Karsten Löhr; Martin Güldenpfennig, both of Ulm, all of Fed. Rep. of Germany

[73] Assignee: Daimler-Benz AG, Fed. Rep. of Germany

[21] Appl. No.: 63,771

[22] Filed: May 20, 1993

[30] Foreign Application Priority Data

May 20, 1992 [DE] Fed. Rep. of Germany ....... 4216638

[51] Int. Cl.$^5$ .................. B03B 9/06; B02C 13/04; B02C 19/06; B07B 9/00
[52] U.S. Cl. ....................................... 241/14; 241/24; 241/DIG. 38
[58] Field of Search .................. 241/14, 19, DIG. 31, 241/DIG. 38, 24, 79

[56] References Cited

U.S. PATENT DOCUMENTS

| | | | |
|---|---|---|---|
| 4,728,045 | 3/1988 | Tomaszek | 241/19 |
| 4,979,682 | 12/1990 | Voelker | 241/19 |
| 5,042,725 | 8/1991 | Grimmer | 241/19 |

FOREIGN PATENT DOCUMENTS

| | | |
|---|---|---|
| 0422460 | 4/1991 | European Pat. Off. . |
| 3535633 | 4/1987 | Fed. Rep. of Germany ... 241/DIG. 38 |
| 239954 | 10/1986 | German Democratic Rep. ............. 241/DIG. 38 |
| 3-23909 | 1/1991 | Japan . |
| 3-77307 | 4/1991 | Japan . |

Primary Examiner—Douglas D. Watts
Attorney, Agent, or Firm—Evenson, McKeown, Edwards & Lenahan

[57] ABSTRACT

A process is provided for disintegration and pure-sorted separation of different plastics of composite structural parts to be recycled, which parts consist of a support composed of thicker-walled hard plastic, an intermediate layer applied with firm adhesion to this support and composed of foam material, and a flexible foil adhering firmly to the outside of the intermediate layer and made thinner-walled than the support. The composite structural parts are first comminuted into approximately cuboid particles preferably of a granulation of approximately 20 mm and comprising still different plastics. Subsequently, the particles formed are disintegrated in a dry manner into their individual materials, and these are then separated in a pure-sorted manner. For this purpose, the less break-resistant foam material of the particles is selectively comminuted mechanically by an impact stressing of the particles to form substantially smaller crumbs than the remaining pieces of particles of more break-resistant plastic. The smaller foam crumbs are screened off from the coarser remaining particle pieces. These two operations are advantageously carried out in a batchwise operated hammer mill with an integrated screen plate. To produce cuboid particles, the composite structural parts are first cut into narrow strips in a twin-shaft cutter, and these are subsequently chopped into short parts in a knife mill. Where three-component structural parts are concerned, the initially remaining mixture of thick-walled hard-plastic fragments and of thin-walled foil chips is separated in a pure-sorted manner by a vertical low-turbulence wind sifter.

6 Claims, 4 Drawing Sheets

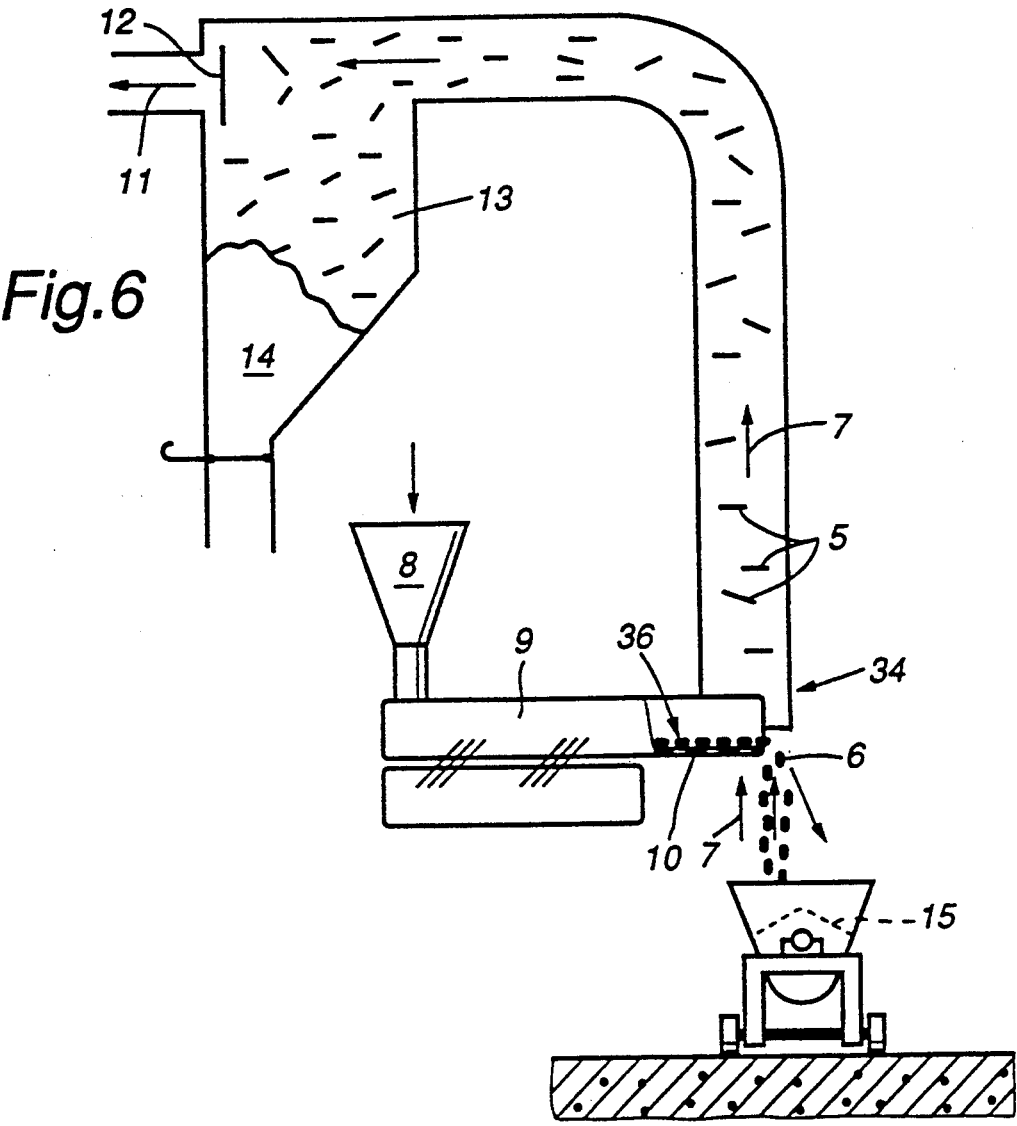
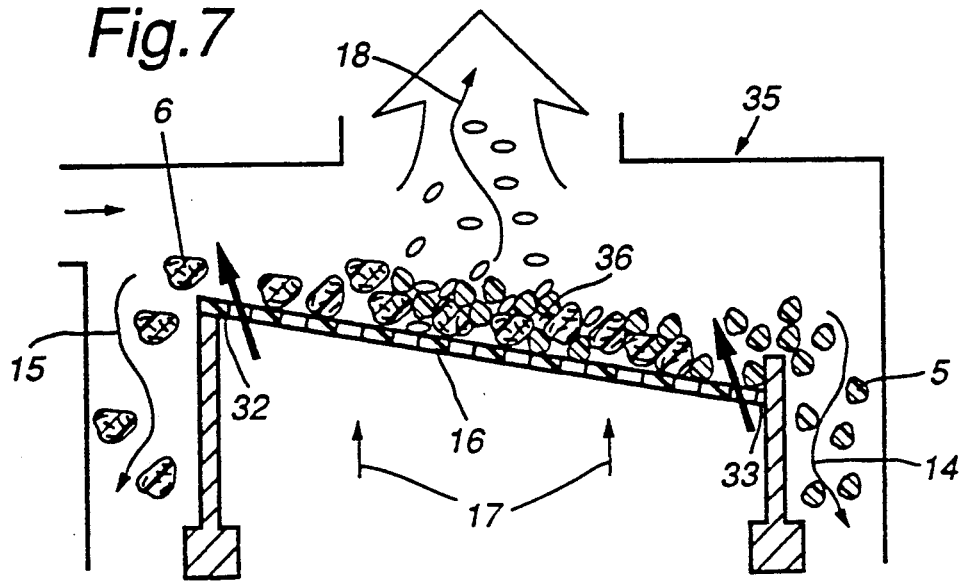

PROCESS FOR DISINTEGRATION AND PURE-SORTED SEPARATION OF RECYCLABLE DIFFERENT PLASTICS OF COMPOSITE STRUCTURAL PARTS

BACKGROUND AND SUMMARY OF THE INVENTION

The present invention relates to a process for disintegration and pure-sorted separation of the different plastics of composite structural parts to be recycled as generally known, for example, from Japanese Patent Application of 21.06.1989 laid open under No. 077307/1991 on 31.01.1991, and more specifically, to parts containing a core of at least foam material and a flexible outer foil adhering firmly thereto and a support made thicker-walled than the outer foil and composed of a hard plastic, firmly adhered to the core in the form of an intermediate layer. Generally speaking, the present invention is directed to a process which includes the step of comminuting the composite structural parts into approximately cuboid particles comprising different plastics, disintegrating the particles into individual materials by selectively comminuting the foam of the particles mechanically into substantially smaller crumbs than the remaining pieces of the particles in a dry treatment and separating the particles in a pure-sorted manner by a grain-size-selective separation such that the smaller foam crumbs are screened off from the coarser remaining particle pieces. Selective comminution of the foam takes place by a impact stressing of the particles, and, after the removal of the foam fraction, the initially remaining mixture of thicker-walled hard-plastic particles and of thinner-walled foil chips is separated into a hard-plastic fraction and into a foil fraction by a vertical low-turbulence upwind sifter, an approximately vertically rising low-turbulence air stream flowing from below against the particles of the mixture which lie flat and individually without overlap, on an air-permeable approximately horizontal base, with only the foil chips being lifted and carried upwards, and the hard-plastic particles remaining being removed laterally at screen level.

In such plastic composite parts, which are used to a great extent in the interior fittings of motor vehicles, several problems arise as regards reusability. For example, the different materials are adhesively bonded with one another very firmly by foam and usually cannot be released from one another or not completely or clearly enough. However, the plastics cannot be reused as a material mixture, and therefore they can be deposited in unsorted form as refuse only at great expense and by causing environmental harm. Furthermore, as regards three-component composite structural parts having a support made of hard plastic, a foam intermediate layer and a foil as an outer skin, there is the further difficulty, where the hard-plastic particles and foil particles are concerned, that they have approximately the same specific gravity and cannot be separated by known separating processes. Even during the production of parts of this kind of composite alone, approximately 30% by weight occurs as stamping waste during the stamping out of perforations and during trimming and as occasional rejects. Moreover, the elimination of parts from old cars after they have been scrapped must also be considered. In view of the large amount of composite parts of this kind, therefore, the problem of how the materials could be removed from the refuse and nevertheless still be used as useful materials is desired to be solved in a way which can be implemented in practice.

The above-mentioned Japanese Preliminary Publication 077307/1991 describes a process for dividing and sorting the different plastics of composite structural parts, especially foil-covered foam parts, in which a coarse comminution in a granulation of 20 to 50 mm is first carried out. The heap of coarse particles is agitated intensively in a high-speed agitator unit having a propeller agitator which rotates in a plane lying horizontally and near the bottom of the agitating container. Shearing forces are exerted on the particles by the rotor blades of the agitator unit and the materials can be detached from one another. The longer the operation continues, the more detachment takes place. Depending on the plastic type of the plastics involved in the composite structural part, a varying fineness of the stock treated in this way is obtained. The ground stock is subsequently classified according to grain size, at least one fraction occurring in a sort purity suitable for reuse. On account of the varying wear resistance of the foam fraction, on the one hand, and of the remaining plastics, on the other hand, the foam material cannot only be finely crumbled by a mechanical fulling or agitation of the particle heap, but can also be rubbed off completely from the other plastic fragments in the region of the adhesive bond, so that these are left entirely free of foam. However, the known process is restricted only to two-component composite structural parts containing one foam component. Experience has demonstrated that the previously known process cannot be applied to all types of foam. Regardless of the type of foam, the known process also cannot be employed for all foam-containing composite structural parts which contain hard plastics reinforced by glass-fiber mats because these plastics, under a shearing or frictional stress on the particle heap, split up or delaminate into thinner sheet-like fragments which cannot be separated in a pure-sorted manner from foil chips of different material.

Furthermore, irrespective of the type of foam, foam-containing three-component composite structural parts having two different plastic components also cannot be separated in a pure-sorted manner in respect of the other two plastics by the known process, as long as the two plastics do not differ or differ only very slightly in terms of the usual classification criteria, such as absolute or specific weight or specific gravity or particle size, as happens in most cases.

U.S. Pat. No. 5,042,725 is also concerned with the problem of suitable treatment of composite structural parts of the type in question here to enable the individual materials to be reused. It describes a process which as a whole works under dry conditions and in which the composite structural parts are first granulated to approximately 10 mm and the particles are then sorted in a plurality of steps, specifically first according to grain size and thereafter according to weight. The weight sorting takes place on an apparently inclined vibrating table having an air-permeable table board through which air is blown upwards. The particles of higher mass collect on one longitudinal side of the table board and the parts of lower mass on the opposite side. An electrostatic charging of the foam particles is prevented or reduced by dampening or by spraying with an antistatic liquid.

It is assumed, of course, in the known process that the sorted-out smaller or lighter particles consist essentially of foam. The foam fraction obtained by the process described there is alleged to contain only approximately 2% by weight of foil in the foam and thus occur in reusable purity. The coarser or heavier fractions, for which no particular further processing is proposed, contain essentially the foil chips, but small pieces of foam apparently still adhere firmly to these, and they are consequently not obtained in the necessary purity for reuse. Other dividing and sorting processes for three-component composite structural parts are also mentioned, and these are likewise based on a granulation of the parts to be treated, but proceed with fundamentally different methods not relevant here. The process described in the above-mentioned U.S. patent is also restricted to only two-component composite structural parts with one foam component. Three-component composite structural parts having two further different plastic components also cannot be separated in a pure-sorted manner by this known process in respect of the other two plastics which are difficult to differentiate. Therefore, these plastics have to either be reused as a poor-grade mixture or disposed of, with all the adverse consequences in terms of cost and the environment.

EP-A 422,460 describes a process for dividing and sorting the different plastics of stamping waste from vehicle dashboards. Such waste occurs when installation orifices for instruments, radios, ventilation gratings or the like are stamped out. The stamping waste consists of a base layer of hydrophilic polyurethane foam and an outer skin of hydrophobic PVC foil connected thereto. The waste pieces are first comminuted into approximately 3 mm large cuboid particles and subsequently swirled in water in the ratio of granules to water of 1 to 7 by an agitator unit in order to separate and sort the different plastics, in the course of which the water-absorbing PU foam swells. The swelling foam detaches from the PVC foil which remains dimensionally stable. Inasmuch as foam particles detached from the foil particles cannot in any case, because of the residual gases still included, float up to the water surface automatically and be collected at a vessel overflow, a complete separation of the foam particles from the foil pieces can be brought about by a flotation operation. The foil pieces which have a substantially higher specific gravity than water can be collected on the bottom of the water vessel and pumped off at intervals. After a drying of the material particles separated in a pure-sorted manner, the materials can be reused.

It is questionable whether the above-described process leads at all to a practicable separation of the different plastic sorts in a reusable sort purity. In particular, in view of the elasticity and compressibility of the foam, the forces which can be exerted on the adhesive bond between the foam and foil as a result of a swelling of the foam residue on the particles are much too low to overcome the substantially higher adhesive forces in such a way that the foam residue can burst off from the foil chips. A detachment of the foam particles from the foil chips can be expected, at most, in regions of an extremely poor adhesive bond between foam and foil which are proportionately small and are not wanted or in the at most theoretically possible case of a subsequent adhesive bonding of a foam body and a formed outer skin by the use of a water-soluble adhesive. Moreover, this process is not workable with three-component composite structural parts having, in addition to foam fractions, also two further plastic components which, although different in terms of material, can nevertheless be differentiated with difficulty where conventional classifying processes ar concerned.

An object of the present invention is to improve the generally known process mentioned at the outset, such that three-component composite structural parts which have two plastic components, different in terms of material and differentiable with difficulty where conventional classifying processes have been concerned, can separate all the plastics involved in a sort purity which is practicable for reuse, without disposable mixed fractions of poor-grade or non-reusability being obtained and without causing variations on the useful materials which impair or make impossible their reusability.

Taking the known process as a starting point, the foregoing object has been achieved according to the present invention by, on one hand, the step of selective comminution of the foam by an impact stressing of the particles, and, after the removal of the foam fraction, the initially remaining mixture of thicker-walled hard-plastic particles and of thinner-walled foil chips is separated into a hard-plastic fraction and into a foil fraction by a vertical low-turbulence upwind sifter, an approximately vertically rising low-turbulence air stream flowing from below against the particles of the mixture which lie flat and individually without overlap, on an air-permeable approximately horizontal base, with only the foil chips being lifted and carried upwards, and the hard-plastic particles remaining being removed laterally at screen level.

Alternatively, the step of selective comminution of the foam can take place in accordance with the present invention by an impact stressing of the particles, and, after the removal of the foam fraction, the initially remaining mixture of thicker-walled hard-plastic particles and of thinner-walled foil chips is separated into a hard-plastic fraction and into a foil fraction by a vibrating-screen separation assisted by an upwardly directed air flow. A vibrating conveyor effect is exerted on the particles, which are dumped in a spread-out entangled state on a vibrating screen inclined relative to a horizontal line and a mesh width of which is markedly smaller than the particle size of the mixture, and is directed towards a higher edge of the vibrating screen. A bearing force of the particles on the vibrating screen and a drag force exerted on the particles as a result of friction relative to the screen are reduced by the upwardly directed air flow, such that the vibrating conveying effect exerted on the lighter foil chips is substantially lower than that on the hard-plastic particles, and only the hard-plastic particles are thereby conveyed to the higher edge of the vibrating screen, whereas the foil chips are discharged via a lower edge of the vibrating screen.

In the former process for carrying out the present invention, the initially remaining mixture of thick-walled hard-plastic fragments and thin-walled foil chips is separated in a pure-sorted manner by a vertical low-turbulence wind sifting which affords a high selectivity. In the latter solution for achieving the objects of the present invention, a procedure with a so-called air jig is used instead.

The advantages of the dividing and sorting process according to the present invention include:
1. A good mutual separation of the individual material fractions from the composite structure is achieved, i.e. the foil particles and the hard-plastic particles are completely free of foam.

2. The individual non-foam particles survive the first treatment step unchanged and undamaged, so that they can still be sorted reliably.
3. The particle mixture consisting of the individual material fractions can be sorted in a reusable purity such that each material is pure.
4. It is possible to reuse the individual materials in an appropriate way usable only in highly sorted form.
5. The amount of refuse is reduced.
6. A commercially viable efficient process results in which components already proven elsewhere are employed.
7. The parts to be treated remain dry during the entire process and can subsequently be reused directly, so that an energy-intensive drying can be avoided.
8. The plastic foil involved and the hard plastic are treated with care and are comminuted into relatively coarse particles of a granulation of preferably approximately 10 to 20 mm which is important, especially with regard to fiber-reinforced hard plastics and their reusability because the included fibers can also be used in an appropriate way only when there is a coarse comminution of such materials; if there is a very fine granulation of fiber-reinforced plastics for the purpose of their reuse, the short fiber fragments act merely as a weighting filler.

BRIEF DESCRIPTION OF THE DRAWINGS

These and other objects, features and advantages of the present invention will become more apparent from the following detailed description of the present invention when taken in conjunction with the accompanying drawings wherein:

FIG. 6 is a schematic diagram of the special upwind sifting provided as a first alternative embodiment for the last separation step of the present invention; and FIG. 7 is a schematic diagram of the air jig provided here as a second alternative to the last separation step of the process according to the present invention.

DETAILED DESCRIPTION OF THE DRAWINGS

Figure 2:
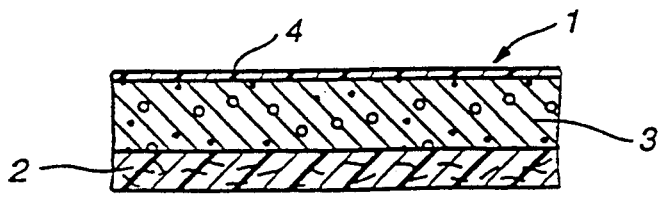
FIG. 2 is a partial cross-sectional view through a composite structural part which consists of three different plastics and the materials of which are to be separated in a pure-sorted manner after the comminution of the part.

A composite structural part 1 is shown in cross-section in cut-out form in FIG. 2 and consists of three different plastics, namely a support 2 made thicker-walled than a flexible outer foil 4 and composed of a preferably glass fiber reinforced hard plastic, e.g. polypropylene reinforced with a glass-fiber mat (GMT-PP), an intermediate layer 3 attached to the support 2 with firm adhesion and composed of foam material, for example polyurethane foam (PUR), and the aforementioned flexible foil 4 attached with firm adhesion to the outside of the intermediate layer 3 and composed of, for example, a mixture of acrylobutadiene-styrene and polyvinyl chloride (ABS/PVC). The composite structural parts can be old parts from passenger cars to be scrapped or production rejects or stamping waste occurring during the production of such parts.

Figure 3:
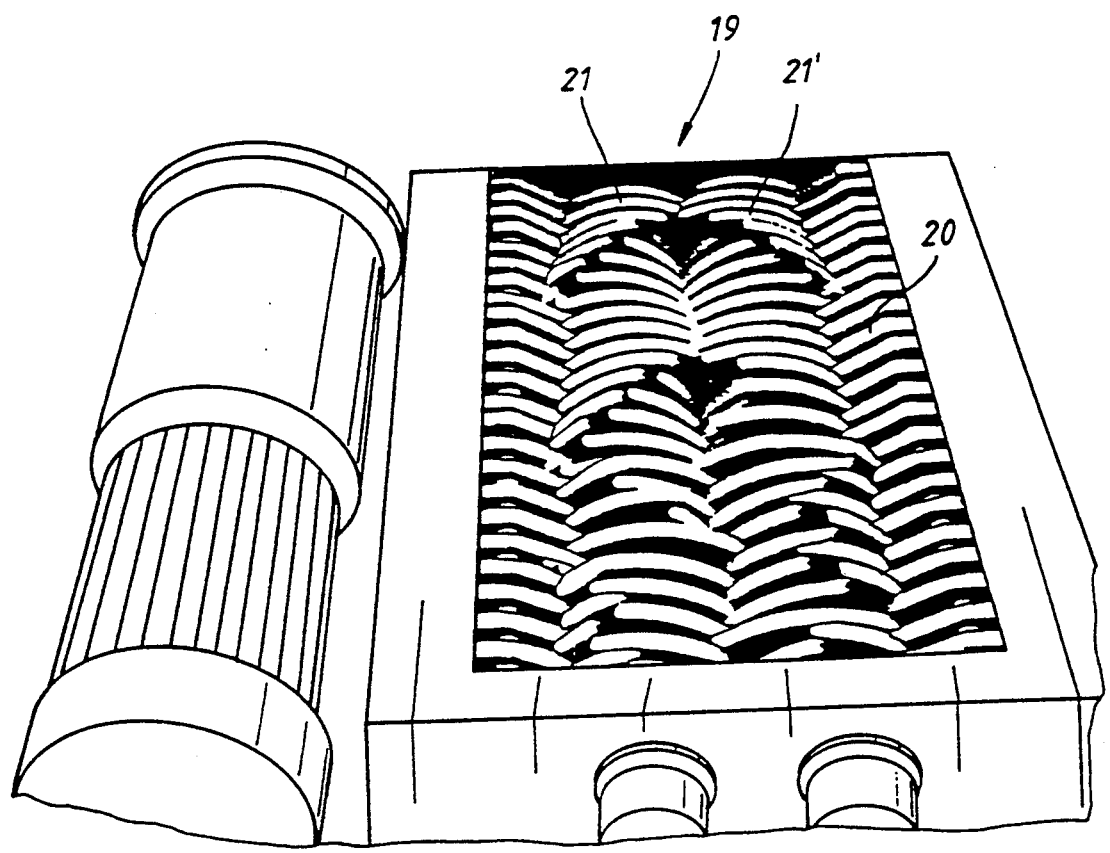
FIG. 3 is a perspective partial view of a twin-shaft cutter used in the process of the present invention.
Figure 4:
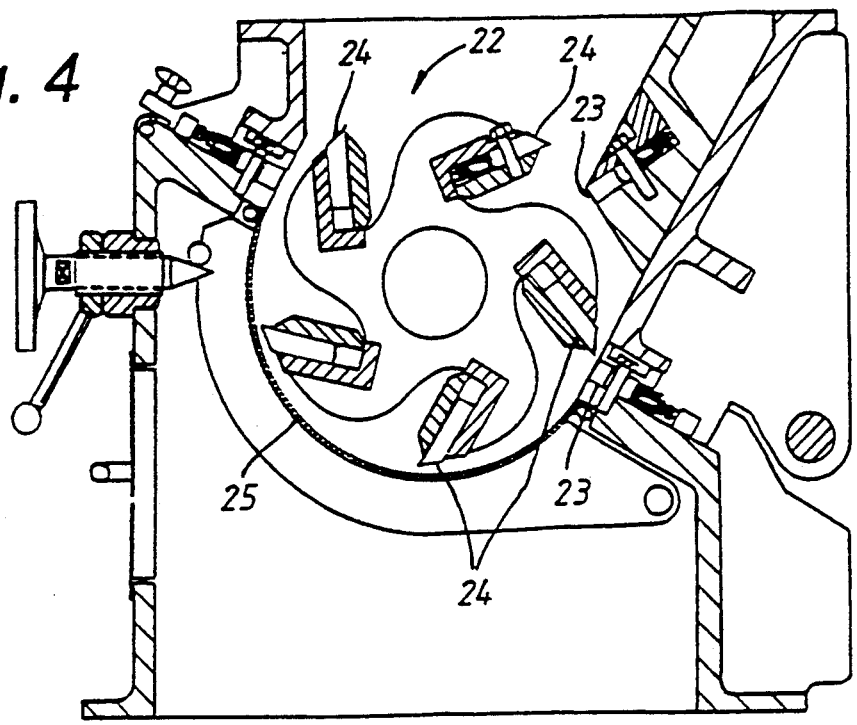
FIG. 4 is a cross-sectional elevation view through a cutting mill usable in the process of the present invention.

For pure-sorted recovery of the plastics, the composite structural parts 1 are first carefully comminuted into approximately cuboid to strip-shaped granulated particles above a particle size of approximately 15 mm. Specifically, by suitable choice of the initial size of the particles during comminution, care is taken to ensure that, as a result of an unavoidable particle breakage during further treatment, the proportion of particle fragments which is of the order of the wall thickness of the plastics involved is as small as possible. Successful tests have been conducted with a particle size of approximately 20 mm. Where strip-shaped particles are concerned, the edge length can be up to 150 mm. The cutting of the composite structural part into strips or cuboid particles should, if possible, be carried out by cutting methods working with care and to a lesser extent by a tearing apart, so that little fine material occurs during the cutting and the composite material structure is also destroyed relatively little. For this reason, suitable devices, for example a twin-shaft cutter 19 (FIG. 3) and, insofar as a second cutting step is provided, for example a low-speed cutting mill 22 (FIG. 4) are provided accordingly for the cutting step.

The comminution can take place in one step or in two steps. The twin-shaft cutter 19 in each case expediently provided initially for comminution disintegrates the composite structural parts 1 into strip-shaped particles. The strips have a width of approximately 2 cm in successfully conducted tests, and the composite material structure having the three different plastics within the strips are also mostly preserved in full. The twin-shaft cutter has two parallel, oppositely driven knife shafts with knife discs 21, 21' arranged perpendicularly to the axis and mutually staggered to engage in one another in a comb-like manner. The knife discs are provided on the outer circumference with hooks which point in the direction of rotation to draw the cutting stock in between the two knife shafts. Stationary knife grids 20 are provided outside the two knife shafts to engage between the knife discs and prevent the cutting stock from sliding laterally past the knife shafts.

The thickness of the knife discs 21, 21' in contact with one another determines essentially the strip width of the comminution stock, whereas the strip length depends essentially on the size of the composite pieces introduced into the twin shaft cutter. Provided the strips are no longer than approximately 150 mm, they can be fed immediately thereafter to the hereinafter described first separating operation under certain circumstances. However, it is usually more expedient also to divide the strips transversely so as to produce essentially cuboid particles whose edge length preferably amounts to at least approximately 20 mm. In these cuboid particles also, the composite material structure comprising altogether three different plastics is still largely maintained. This chopping of the strips into cuboid particles can be carried out in a second pass through the same or another two-shaft cutter, in which the strips of the first pass are oriented parallel to the knife shafts and cut transversely.

Figure 1:
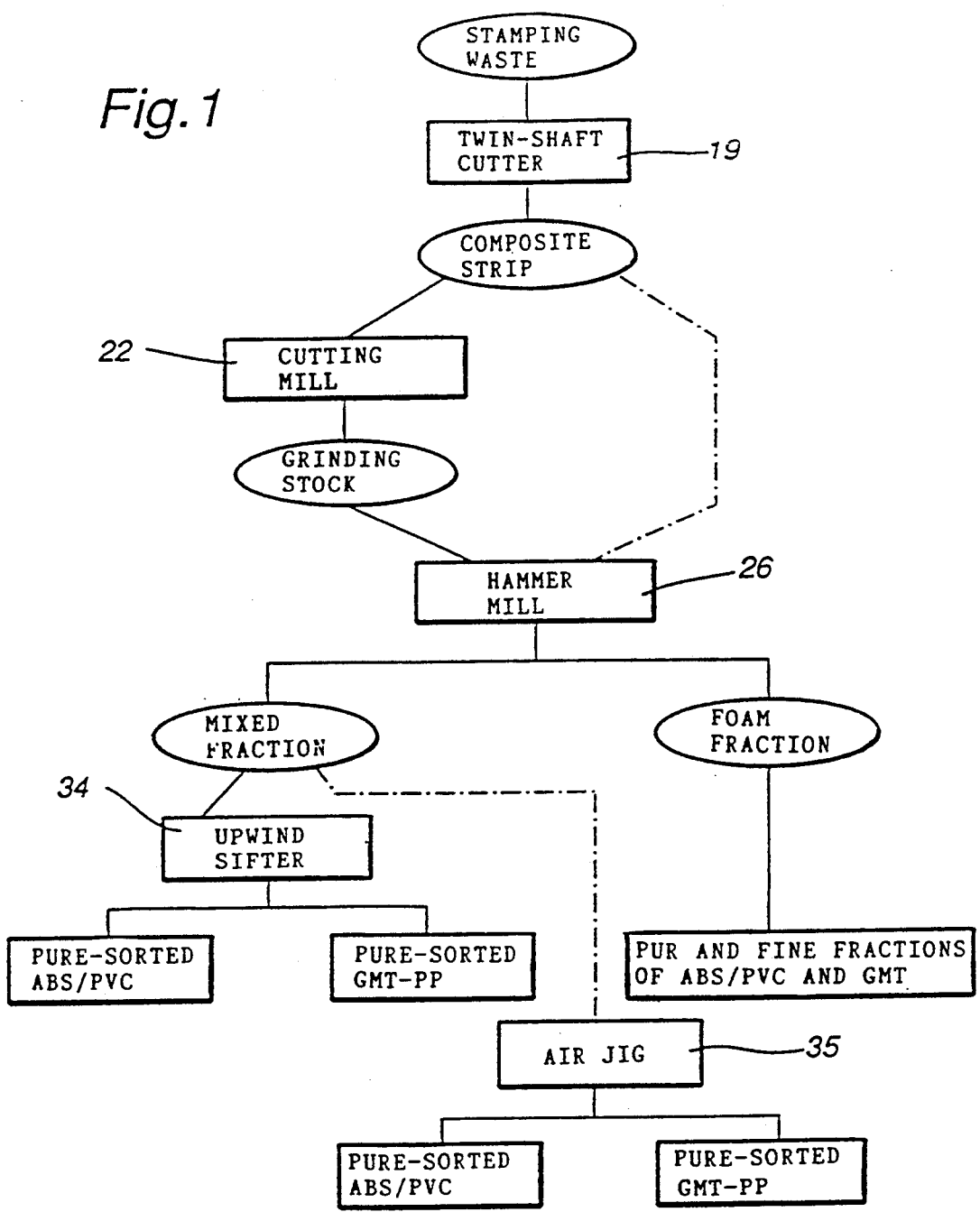
FIG. 1 is a flow diagram of the process according to the present invention in which possible process alternatives are also displayed.

According to the process flow diagram illustrated in FIG. 1, however, the cross-cutting of the strips, to be carried out where appropriate, is provided in a cutting mill 22 (FIG. 4) having a rotor with a plurality of axially or helically extending rotating knives 24 and knives 23 arranged fixedly relative to the housing. On the underside, the knife rotor is surrounded by a screen casing which, together with the orifice width of the passage orifices made in it, determines the granulation of the ground stock which can be obtained with the cutting mill.

Starting from the particles of the composite structural part thus comminuted, the particles initially still present as a three-component composite structure are now to be disintegrated into their individual useful materials and these separated in a pure-sorted manner. For this purpose, in a first step, the less break-resistant foam material of the particles is selectively comminuted mechanically by impact stress on the individual particles into substantially smaller crumbs than the remaining pieces of particles of more break-resistant plastic. The smaller foam crumbs can then be separated, especially screened off, from the coarser remaining particle pieces by a grain-size-selective separating process.

Figure 5:
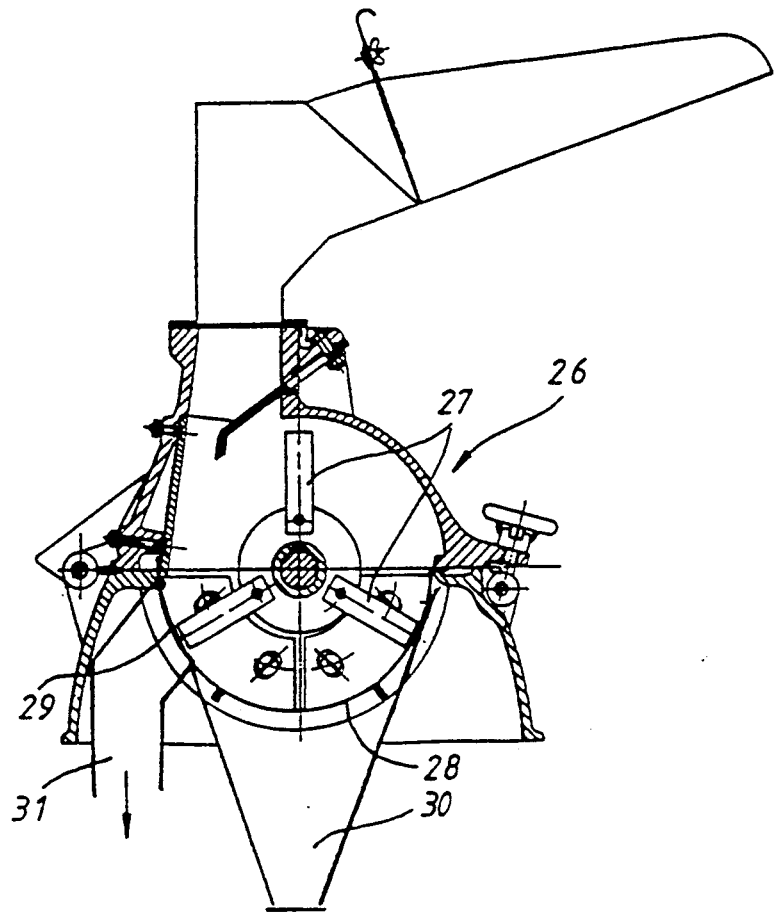
FIG. 5 is a cross-sectional elevation view through a hammer mill usable in the process of the present invention.

The impact stress on the particles and the screening off of the comminuted foam crumbs are preferably carried out in a hammer mill 26 (FIG. 5), in which the particles are selectively comminuted in the course of a moderate rotation of the rotating grinding assembly without an appreciable amount of heat being generated. The rotation speed of the hammer mill 26 is primarily critical for determining whether the comminuting effect selective for the foam material does in fact occur. This speed is ascertained empirically in a known manner by tests in each particular case. The dwell time of the particles in the hammer mill and the degree of filling have much less influence on the selectivity of the comminuting effect. Integrated into the casing surrounding the rotating grinding assembly is a screen plate 28, through which the broken foam crumbs can pass continuously out of the hammer mill. The coarse plastic fragments left behind in the region of the rotor are increasingly freed of foam material and are finally cleared of this completely. After a particular treatment time, this mixed fraction still containing two different plastics can be discharged through a discharge flap 29. Finally, new comminution stock to be treated can be introduced into the hammer mill from above, care being taken to ensure a well-metered feed of the hammer mill.

An optimum filling quantity per batch can be determined empirically relatively quickly. The dwell time of the ground stock within the hammer mill can also be determined empirically relatively easily. On one hand, the foam material is to be removed from the remaining plastic particles in a manner free from residue; on the other hand, this material is not to be comminuted unnecessarily, to avoid a needlessly large proportion of foil material or of the support material being discharged together with the foam crumbs. The foam fraction would consequently be undesirably mixed with materials of the other types of plastic. The crumbly foam fraction comes out of the hammer mill at the bottom more or less continuously at the fine-stock discharge 30. Towards the end of the treatment time, markedly less foam crumbs fall out at the discharge 30. The coarse parts of the mixed fraction are discharged in batches at the discharge 31 after the discharge flap 29 has been opened. The foam fraction can be reused, under some circumstances after a further separation of very fine abraded particles from the other plastics.

For the sake of completeness it should also be mentioned that an impact stressing of the particles can be carried out not only, as in the hammer mill, by causing a hard object, the "hammer", to strike a freely suspended particle. Impact stressing can also be effected by causing a particle flying at high speed to strike an obstacle, such as a transverse wall or a particle flying at approximately the same speed in the opposite direction. For example, the particles can be accelerated in the manner of a blast of shot by way of a blower and be directed against a wall or into an oncoming particle stream. This operation has to be repeated several times by a closed-circuit guidance of the particles. In this case, however, the number of impacts per particle and per unit time is lower than in the hammer mill, and therefore this embodiment of the process may be preferred.

The mixed fraction coming out of the rotor of the hammer mill 26 has to be separated into the two different sorts of plastic in a further separation step. Specifically, the remaining mixture 36 contains thick-walled hard-plastic particles 6 and thin-walled foil chips 5. The two different particles are differentiated neither in terms of their specific gravity nor in terms of their size, but merely in their wall thickness.

So that the particles can nevertheless be separated from one another in a pure-sorted manner, a vertical low-turbulence upwind sifter 34, is used, according to one process alternative shown in FIG. 6, in which the mixture is separated into a hard-plastic fraction 15 and into a foil fraction 14. The separating effect of the upwind sifter 34 is caused by the air resistance of the foil chips within the upwardly directed low-turbulence air stream being just slightly higher than the respective dead weight of the foil chips, whereas the dead weight of the hard-plastic particles 6 clearly predominates over the flow resistance, and therefore these particles remain lying. The mixed fraction 36 is delivered via a filling funnel 8 onto a vibrating conveyor 9 having a screen plate 10, on which the particles are moved slowly into the region of an upwardly directed low-turbulence air stream 7. The particles are individually separated as a result of the slow conveyance on the screen plate 10, so that they lie on the screen plate next to one another without overlap and can be picked up individually by the air stream 7.

It is important for a pure-sorted separation of the particles in the separator of FIG. 6 that the air stream 7 flows without the formation of large-volume vortices, i.e. with low turbulence and optimally in a laminar manner and be so strong that only the lighter foil chips 5 lying flat are lifted and carried upwards and that the heavier hard-plastic particles 6 are initially left behind on the screen plate 10. As a result of the incessant conveying effect of the vibrating conveyor, the particles 6 are removed laterally from the air stream 7 and pass into a collecting vessel 15 there. The foil chips 5 lifted upwards are carried via a collecting line to a collecting space 13. As a result of a slowing of the flow in this channel widening, the foil chips descend and accumulate there. A baffle plate 12 retains foil chips which may possibly fly further, so that they do not pass into the suction-air stream 11 leading to an exhaust fan.

An alternative dry separating process shown in FIG. 7 also employs an upwardly directed low-turbulence air stream 17 of well-metered intensity and also a vibrating screen 16. However, the vibrating screen 16, onto which the mixed fraction 36 is delivered, is inclined relative to the horizontal and therefore has a higher edge 32 and a lower edge 33. The suspension of the vibrating screen 16 and the excitation of the vibrating screen 16 to vibrate with a conveying effect are such that a conveying effect towards the higher edge 32 is generated. The upward air stream 17 passing vertically through the vibrating screen 16 is so metered in its intensity that the bearing force of the particles on the vibrating screen and therefore the drag force exerted on the particles as a result of friction relative to the screen are reduced. The bearing force of the foil chips 5 is cancelled almost completely, whereas the hard-plastic particles 6 still lay on the vibrating screen 16 with a considerable proportion of their dead weight.

A vibrating conveying effect is thereby exerted virtually only on the hard-plastic particles 6 in the embodiment of FIG. 7, so that these particles are conveyed to the higher edge 32 and are discharged there as a hard-plastic fraction 15. The foil chips 5, on which no conveying effect acts, collect at the lower edge 33 and overflow there as a foil fraction 14. The air jig 35 thus formed is covered with a cowl, on which dust and remaining foam crumbs can be sucked off at the top by means of the fine-stock suction 18. This suction stream can be adjusted independently of the upward air stream 17, with the result that air can additionally be introduced or even blown in via the edge 32. Foil chips are thereby additionally detained from being transported over the higher edge 32 at which the hard-plastic fraction overflows.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A process for disintegration and pure-sorted separation of different plastics of recyclable composite structural parts containing a core of at least foam material and a flexible outer foil adhering firmly thereto and a support made thicker-walled than the outer foil and composed of a hard plastic, firmly adhered to the core in the form of an intermediate layer, comprising the steps of comminuting the composite structural parts into approximately cuboid particles of different plastics, disintegrating the particles into individual materials by selectively comminuting the foam of the particles mechanically into substantially smaller crumbs than the remaining pieces of the particles in a dry treatment, and separating the particles in a pure-sorted manner by a grain-size-selective separation such that the smaller foam crumbs are screened off from the coarser remaining particle pieces, wherein the step of selective comminution of the foam takes place by an impact stressing of the particles, and, after the removal of the foam fraction, the initially remaining mixture of thicker-walled hard-plastic particles and of thinner-walled foil chips is separated into a hard-plastic fraction and into a foil fraction by a vertical low-turbulence upwind sifter, an approximately vertically rising low-turbulence air stream flowing from below against the particles of the mixture which lie flat and individually without overlap, on an air-permeable approximately horizontal base, with only the foil chips being lifted and carried upwards, and the hard-plastic particles remaining being removed laterally at screen level.

2. A process for disintegration and pure-sorted separation of different plastics of recyclable composite structural parts containing a core of at least foam material and a flexible outer foil adhering firmly thereto and a support made thicker-walled than the outer foil and composed of a hard plastic, firmly adhered to the core in the form of an intermediate layer, comprising the steps of comminuting the composite structural parts into approximately cuboid particles of different plastics, disintegrating the particles into individual materials by selectively comminuting the foam of the particles mechanically into substantially smaller crumbs than the remaining pieces of the particles in a dry treatment, and separating the particles in a pure-sorted manner by a grain-size-selective separation such that the smaller foam crumbs are screened off from the coarser remaining particle pieces, wherein the step of selective comminution of the foam takes place by an impact stressing of the particles, and, after the removal of the foam fraction, the initially remaining mixture of thicker-walled hard-plastic particles and of thinner-walled foil chips is separated into a hard-plastic fraction and into a foil fraction by a vibrating-screen separation assisted by an upwardly directed air flow, there being exerted on the particles, which are dumped in a spread-out entangled state on a vibrating screen inclined relative to a horizontal line and a mesh width of which is markedly smaller than the particle size of the mixture, with a vibrating conveying effect occurring directed towards a higher edge of the vibrating screen, and a bearing force of the particles on the vibrating screen and a drag force exerted on the particles as a result of friction relative to the screen being reduced by the upwardly directed air flow, such that the vibrating conveying effect exerted on the lighter foil chips is substantially lower than that on the hard-plastic particles, and only the hard-plastic particles are thereby conveyed to the higher edge of the vibrating screen, whereas the foil chips are discharged via a lower edge of the vibrating screen.

3. The process according to claim 1, wherein the composite structural parts are divided into at least one of approximately cuboid and strip-shaped particles of a granulation at least approximately 15 mm, and with edge lengths of no greater than about 150 mm for the strip-shaped particles.

4. The process according to claim 1, wherein the impact stressing of the particles and the screening off of the broken foam crumbs occurs in a hammer mill having a screen plate integrated into the casing surrounding the rotating grinding assembly, such that the broken foam crumbs emerge continuously out of the screen plate from the hammer mill, and the coarse foam-free plastic fragments are removed in batches from the hammer mill.

5. The process according to claim 1, wherein the comminution of the composite structural parts into approximately cuboid particles takes place in two steps by way of cutting low in fine stock by the composite structural parts being first cut into narrow strips and these being thereafter chopped into short parts likewise in a manner low in fine stock.

6. The process according to claim 1, wherein the cutting of the composite structural parts into the narrow strips takes place in a twin-shaft cutter and the chopping of the strips into the cuboid particles takes place in a cutting mill.

* * * * *